US006208175B1

United States Patent
Zydek et al.

(10) Patent No.: US 6,208,175 B1
(45) Date of Patent: *Mar. 27, 2001

(54) CIRCUIT ARRANGEMENT FOR THE EVALUATING A BINARY SIGNAL DEFINED BY CURRENT THRESHOLD VALUES

(75) Inventors: Michael Zydek, Langgons; Wolfgang Fey, Niedernhausen, both of (DE)

(73) Assignee: ITT Manufacturing Enterprises, Inc., Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/836,930
(22) PCT Filed: Jul. 3, 1996
(86) PCT No.: PCT/EP96/02908
§ 371 Date: Sep. 16, 1997
§ 102(e) Date: Sep. 16, 1997
(87) PCT Pub. No.: WO97/11528
PCT Pub. Date: Mar. 27, 1997

(30) Foreign Application Priority Data

Sep. 20, 1995 (DE) .............................................. 195 34 825

(51) Int. Cl.[7] ...................................................... H03K 5/22
(52) U.S. Cl. ................................................. 327/75; 361/98
(58) Field of Search .................................. 327/75, 88, 316, 327/50, 78, 427, 434; 361/98

(56) References Cited

U.S. PATENT DOCUMENTS

| 4,651,138 | 3/1987 | Morrison | 340/510 |
| 5,224,007 | 6/1993 | Gill | 361/45 |
| 5,245,261 | * 9/1993 | Ashley et al. | 318/558 |
| 5,469,076 | * 11/1995 | Badyal et al. | 326/16 |
| 5,502,298 | * 3/1996 | Geller | 250/205 |
| 5,568,347 | * 10/1996 | Shirai et al. | 361/98 |

FOREIGN PATENT DOCUMENTS

WO9711528   3/1997   (WO) .

* cited by examiner

*Primary Examiner*—Jung Ho Kim
(74) *Attorney, Agent, or Firm*—Rader, Fishman & Grauer PLLC

(57) ABSTRACT

A circuit arrangement for evaluating a binary signal defined by two current thresholds, particularly the output signal of an active sensor [(1')], comprises a current source [(IQ'_, $IQ_{11}, IQ_{12}, IQ_{13}$)] that can consist of individual current sources and is connected in series to the signal source, namely the sensor [(1')]. The current source is inserted between the battery terminal [(IGW)] and the sensor terminal [(A1)] and serves simultaneously as a current limiter in case of a short circuit between the sensor terminal [(A1)] and ground [(GND)].

5 Claims, 4 Drawing Sheets

CIRCUIT ARRANGEMENT FOR THE EVALUATING A BINARY SIGNAL DEFINED BY CURRENT THRESHOLD VALUES

TECHNICAL FIELD

The invention pertains to a circuits for sensing binary signals.

BACKGROUND OF THE INVENTION

Such a circuit arrangement is described in the older, not previously published German Patent Application No. 195 10 055.7. Specifically this discusses an active binary sensor as the source for this binary signal. This sensor generates a square-wave signal based on two different current values or current thresholds. The frequency of this square-wave signal contains the information to be measured.

From the older, not previously published DE 44 34 34 180 A1 a circuit arrangement is known for evaluating a binary signal, thus including the output signal of an active binary sensor, in which a signal current proportional to the sensor current is obtained with the aid of a current-mirror circuit. This signal current is tapped by way of an ohmic resistor from a constant-voltage source, whereby a binary voltage signal proportional to the sensor output voltage is generated. The current-mirror circuit thus serves for converting the current signal of the sensor into a binary voltage signal which can then be further processed with small effort and above all with a low power requirement.

Active sensors of the type under discussion here can be employed, for instance as wheel sensors for determining the rotational behavior of one of the individual wheels of a motor vehicle. The wheel rotational behavior is a particularly important input parameter for motor vehicle control systems which are utilized, for instance, for antilocking protection, for control of drive slippage, vehicle stability, and so on.

These control systems or some of their functions are considered safety-critical, because in case of a defect, the braking function or driving stability may be compromised. Numerous monitoring measures, error displays and so on are therefore prescribed.

Particular value is placed on designing the terminal wires or terminal pins with which the controller of ABS is equipped and which serves for connecting the wheel sensors and other components or the associated circuits to be short-circuit resistant. Since the loads in a motor vehicle are generally connected to one terminal of the vehicle battery or current generator by way of the vehicle chassis, this means that the second individual terminals or terminal pins lead to the second terminal of the battery. This applies also to the terminal pins of the sensors.

Therefore, when connecting the sensor terminal pins to the chassis, a short-circuit or overload protection must be in place. This has the consequence in practice that the terminals leading to the battery or an individual terminal of the battery (the positive pole, for instance) must be directed by way of a current-limiting circuit, which upon the occurrence of a short circuit restricts the current to a permissible value.

It is also prescribed that several mutually independent terminals of the sensors be present, so that, in case of a sensor defect or a short circuit, the effect of this short circuit is limited and the other sensors or at least some of the other sensors remain functional. Consequently, each of the terminals to be protected must be equipped with a separate current limiter.

The invention overcomes the problems associated with reducing the required effort for short-circuit-proof layout of the terminal pins of a circuit arrangement of the type mentioned initially, without having to accept disadvantages of other type.

This problem can be solved by the present invention. The particularity of the circuit arrangement according to the invention is thus that in a circuit system with a ground connection, as found in motor vehicles, the current source used for evaluating the sensor signal is inserted between the battery or individual terminal and the sensor terminal and serves as a current limiter and thus as overload protection in case of a short circuit or shunt between the sensor pin and ground.

Due to the mode of connecting the sensor or current source according to the invention, the current limiter circuit, which previously had to be inserted between the terminal pin and the battery terminal, becomes superfluous. Beyond that, an individual protection of each sensor terminal against short circuits is achieved, because each sensor or each sensor evaluation circuit is equipped in any case with a separate current source for evaluating the sensor signal.

Using the current limiter of the present invention results in a significant savings. In contrast to conventional current limiters, the circuit arrangement according to the invention can be implemented very easily by an integrated circuit. This integrated circuit can then be protected in a very simple manner by a thermal fuse, also constructed and integrated on a semiconductor basis, against overload by excessively high loss power caused, for instance, by a continuing short circuit.

Several particularly advantageous embodiments of the circuit arrangement according to the invention are described in the subordinate claims.

Additional characteristics, advantages and application possibilities of the invention can be obtained from the following description of embodiments on the basis of the attached figures.

BRIEF DESCRIPTION OF THE PREFERRED EMBODIMENT

DETAILED DESCRIPTION OF THE PREFERRED EMBODIMENT

Figure 1:
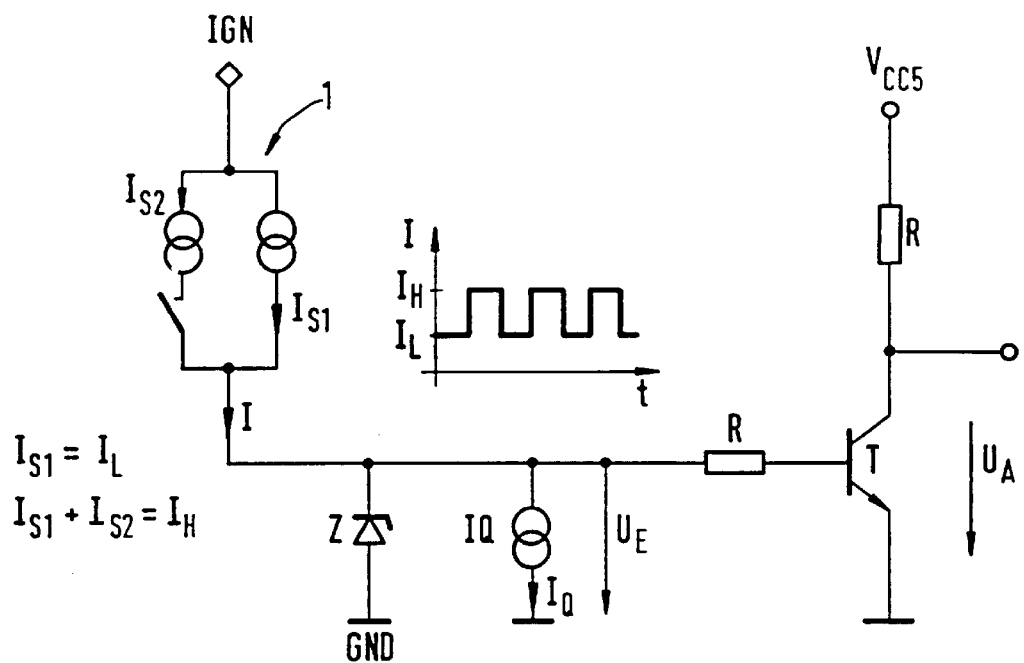
FIG. 1 is a schematically simplified, a circuit arrangement for evaluating the output signal of an active sensor.

The basis for the embodiment according to FIG. 1 is the use of an active rpm sensor 1 in a motor vehicle. Such a sensor 1 can be a component of a motor vehicle control system. A signal whose frequency is proportional to the rotational velocity of the respective wheel can be obtained with the aid of such sensors or wheel sensors.

In the illustrated example the measurement element is an active sensor 1 whose output is preferably bound by two current threshold values, namely a lower current level of 7 mA and an upper current level of 14 mA. The lower level can, however, be set between 5 and 8 mA and the higher level can be set from 11 to 18 mA. The lower current is necessary in order to maintain the orderly functioning of the active sensor 1. A terminal IGN, through which the connection to the positive terminal of the vehicle battery can be produced upon switching on the ignition, serves as a current source here. The ground connection leads to the negative terminal of the battery.

The wheel sensor 1 is shown here as a current source which is composed of two individual current sources. One of these individual current sources supplies the low current $I_L=I_{s1}$, which is supplemented to form the high current $I_H=I_{s1}+I_{s2}$ in the high phase of the signal by connecting the second individual current source or an additional current source $I_{s2}$.

A second current source IQ designed for a nominal current $I_0$ is connected in series with the active sensor 1. In more precise terms, this current source is a current sink as will become evident from the explanations below.

The nominal current $I_0$ lies above the lower current threshold value of the sensor 1, i.e., the low current $I_L$. It is practical for the nominal current $I_0$ from the current source IQ to be chosen to correspond to an intermediate value between the two current threshold values $I_L$ and $I_H$. An amplifier stage, here. the base-emitter junction of a transistor T, is connected in parallel with the current source IQ. The voltage drop across the current source IQ is simultaneously the input voltage $U_E$ of the amplifier stage T. The circuit according to FIG. 1 functions as follows.

So long as the current from the sensor 1 is below the nominal current, or the applied current from the current source IQ, which applies for the low phase of the sensor 1, the potential $U_E$ at the input of the amplifier circuit T is reduced by the current source IQ almost to ground potential GND. The transistor T is not conducting. The output signal, or the output potential $U_A$ of the amplifier circuit, that is, the potential at the collector of the transistor T is high; the output signal $U_A$ takes on the full value of the supply voltage $V_{cc5}$.

However, as soon as the sensor current I rises above the nominal current $I_0$ of the current source IQ, the transistor T conducts. This is the case in the high phase, when the sensor 1 is supplying the high current $I_0$. The current source IQ is only capable of sinking its nominal current $I_0$. Any current above that leads to an increase in the potential $U_E$, conduction of the transistor T and a low value of the output signal $U_A$. In this phase the input potential $U_E$ is limited by a Zener diode Z in parallel with the current source IQ. Having the current flow through the Zener diode Z also ensures that a current IH which is sufficient for the operation of the sensor 1 can flow.

Figure 2:
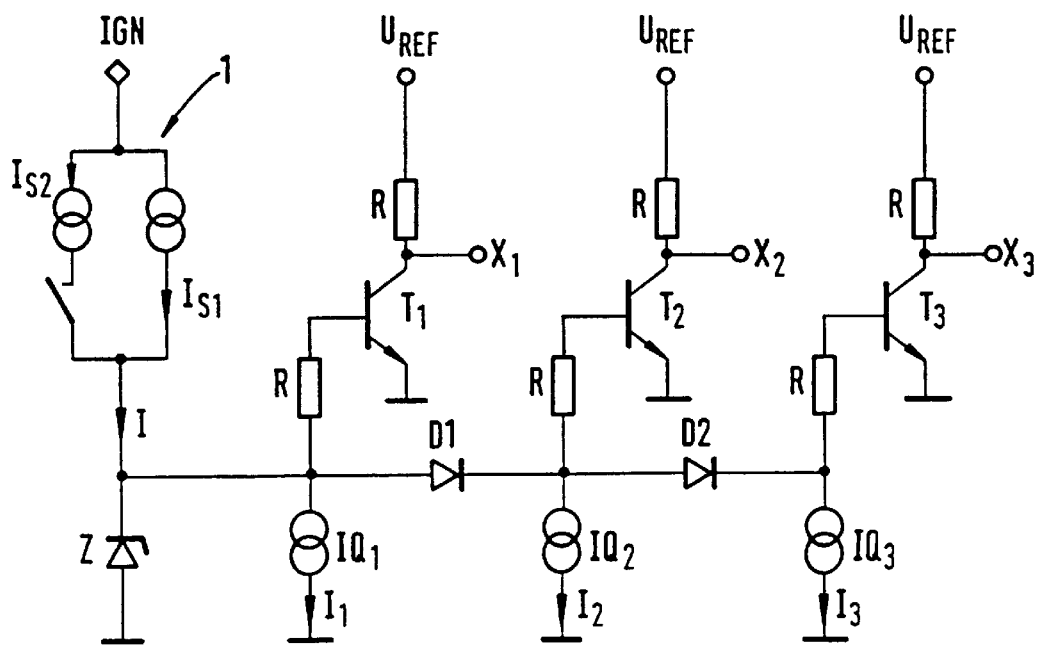
FIG. 2 shows a circuit arrangement presented in the same manner to illustrate error detection.

The circuit according to FIG. 1 can be expanded simply and with little expense to a circuit that is capable of recognizing and displaying sensor errors. These sensor errors also include a short circuit of the connection line to ground (GND) or battery (IGN), an interruption of the line and shunts. The mode of operation of such a circuit with error recognition is illustrated in FIG. 2. This expansion is achieved by a division of the second current source (IQ in FIG. 1) into several—here, three—individual current sources $IQ_1$, $IQ_2$, $IQ_3$. The potential across these current sources is determined in each case with a parallel-connected amplifier stage, symbolized by the transistors $T_1$, $T_2$, $T_3$, Diodes D1 and D2 serve to decouple the individual current sources.

The individual current sources $IQ_1$, $IQ_2$ and $IQ_3$ are connected together and to the active sensor 1 such that the first individual current source $IQ_1$ connected directly to the sensor 1 signals a power interruption or a sensor current lying below a minimum level. In the present example, $IQ_1$ is designed for a minimum current of $I_1=3$ mA, so that the associated amplifier stage $T_1$ is triggered only if the signal current or sensor current I exceeds this level. A "high" at the output $X_1$ of the associated amplifier circuit $T_1$ consequently indicates a line interruption or a sensor current I which is too low for another reason.

The next, via the diode D1, individual current source $IQ_2$, which is designed here for a near value nominal current $I_2=7$ mA but can be around 10 mA, becomes conductive as soon as the sensor current exceeds the minimum value $I_1$. At the output of the amplifier circuit $T_2$, which is in parallel with the individual current source $IQ_2$, a high signal is present until the sensor current reaches or exceeds the sum of the nominal currents $I_1+I_2$ of the two current sources $IQ_1$ and $IQ_2$. Only then does the signal at output $X_2$ of stage $T_2$ change from "high" to "low." Since the sum $(I_1+I_2)$ of the nominal currents of the above-described individual current sources $IQ_1$ and $IQ_2$ exceeds the lower threshold current value $I_2$ of the wheel sensor 1, but the nominal current of the individual current source $IQ_2$ is not reached in the low phase of the sensor, the evaluative voltage signal, which represents the result of the current-voltage transformation and corresponds to the output signal $U_A$ of FIG. 1, is available at the output of the amplifier stage $T_2$ in regular operation of the wheel sensor 1, that is, in case of constant alternation of the sensor signal current between the lower current threshold value $(I_1)$ and the upper one $(I_2)$.

The third individual current source $IQ_3$ according to FIG. 2 serves to signal an excessively high sensor current due to a fault or an excessively high input current into the evaluation circuit. An excessively high current can be produced by a shunt or even a short circuit to the supply terminal IGN. The nominal current of the third individual current source $IQ_3$ determines the maximum value, which can be around 18 mA value. If the sum $I_1+I_2+I_3$ of the nominal currents of the individual current sources $IQ_1$, $IQ_2$, $IQ_3$ is exceeded, this results in a triggering of the amplifier stage $T_3$ and therefore in a change of the signal at output $X_3$ of this amplifier stage from "high" to "low."

Figure 3:
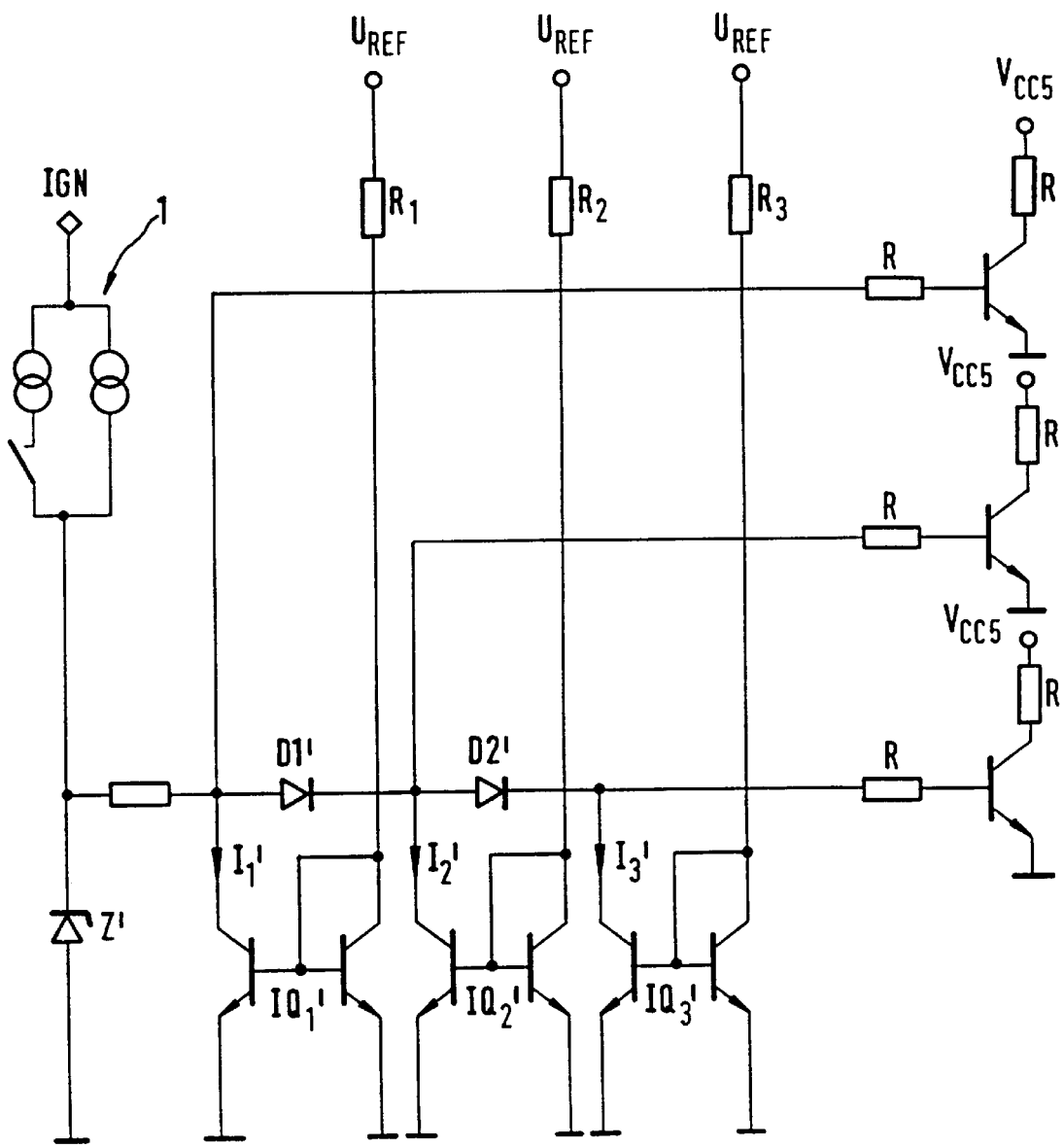
FIG. 3 shows a part of an integrated circuit for implementing the circuit of FIG. 2.

FIG. 3 shows an example of the implementation of the circuit according to FIG. 2. All the illustrated components are parts of an integrated circuit. The individual current sources $IQ_1'$, $IQ_2'$ and $IQ_3'$ are implemented here with current-mirror circuits. The nominal current or applied current is specified in familiar manner by appropriate selection of the ohmic resistors $R_1, R_2, R_3$ and specifying the supply voltage $U_{REF}$. From the potential at outputs $X_1'$ and $X_3'$ of the amplifier circuits $T_1'$ and $T_3'$ it can again be recognized in the manner described on the basis of FIG. 2 whether a sensor fault is present. The converted sensor signal is available for further processing at output $X_2'$ of the amplifier circuit $T_2'$.

The voltage $U_{REF}$ required for setting the nominal currents is stabilized in each case, while an unstabilized or only roughly stabilized voltage would suffice in many application cases for the supply voltage $V_{cc5}$.

It can be recognized from the foregoing description that the invention can be implemented particularly well in the form of integrated circuits. Only a few components are required for signal evaluation and fault recognition. The power consumption is low. An essential advantage is that no high requirements need be placed on the precision of the components and the setting of the current thresholds. This has a favorable effect on the production costs for such a circuit arrangement. Moreover, high reliability in operation can be expected for the same reasons. Since the nominal currents of the individual current sources and thus the circuit thresholds for fault recognition can be changed easily and with little expense, by adjusting the reference voltage, for instance, an adaptation to sensors of different types is easily possible.

Figure 4:
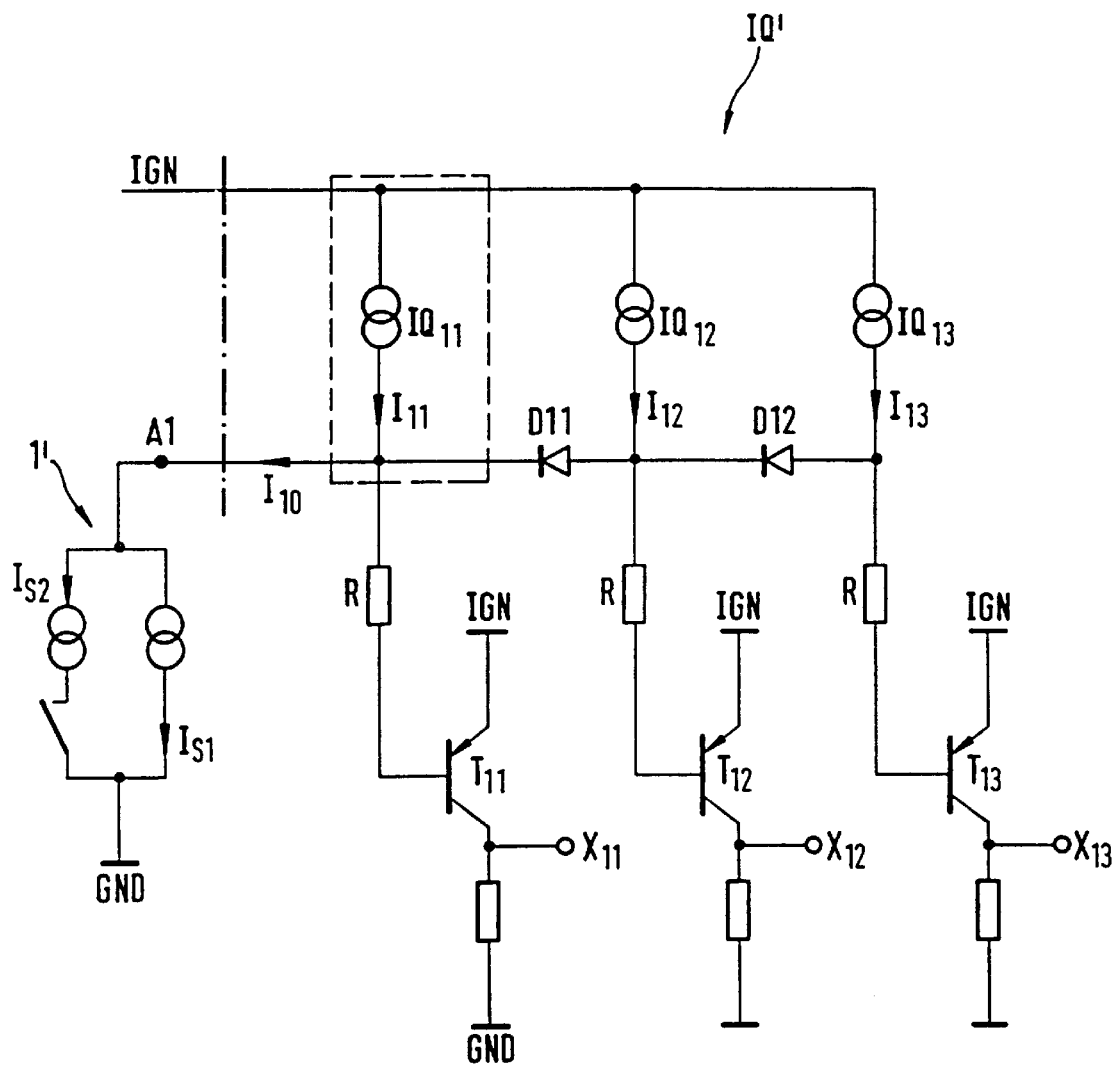
FIG. 4 shows an embodiment of a circuit arrangement according to the invention presented in the same manner as FIG. 2.

Unlike the circuit arrangement according to FIG. 2, a current source consisting of the individual current sources $IQ_{11}, IQ_{12}$ and $IQ_{13}$ is inserted in the embodiment according to FIG. 4 between the battery terminal IGN—generally the positive pole—and a terminal or terminal pin A1 serving to connect the associated active sensor 1'. A dotted-dashed line symbolizes the separation of the electronic circuit components housed in a regulator and shown at the right from terminal pin A1 shown at the left, to which the active sensor 1' is connected via a signal line. The second sensor terminal is connected to ground GND. The current source IQ' and the active sensor 1' are connected in series like the circuits explained in the aforementioned FIGS. 1–3.

In the normal case, the individual current source $IQ_{12}$ or the associated amplifier circuit $T_{12}$ makes the sensor signal available at its output $X_{12}$, in the same manner as the current source $IQ_2$ with the amplifier circuit $T_2$ of the circuit according to FIG. 2. The current source $IQ_{11}$ and the associated amplifier circuit $T_{11}$ signal a line interruption or an open terminal pin A1, while the individual current source $IQ_{13}$ brings about a change of the signal at the output $X_{13}$ of the amplifier circuit $T_{13}$ in case of short circuit or a shunt between the terminal A1 and ground GND.

The maximum possible short circuit current that appears in case of a short circuit of the terminal A1 to ground is given by the sum of the applied currents of the three individual current sources $IQ_{11}, IQ_{12}, IQ_{13}$, that is, $I_{11}+I_{12}+I_{13}$. The presence of a short circuit is indicated by the output signal $X_{13}$. The illustrated circuit, which is preferably produced by integration technology, is designed for at least a short-term load with this short-circuit current. It is possible for a temperature-dependent semiconductor element that shuts off the current supply in conventional manner to be built into the integrated circuit to counteract the thermal load when the short circuit is maintained.

Figure 5:
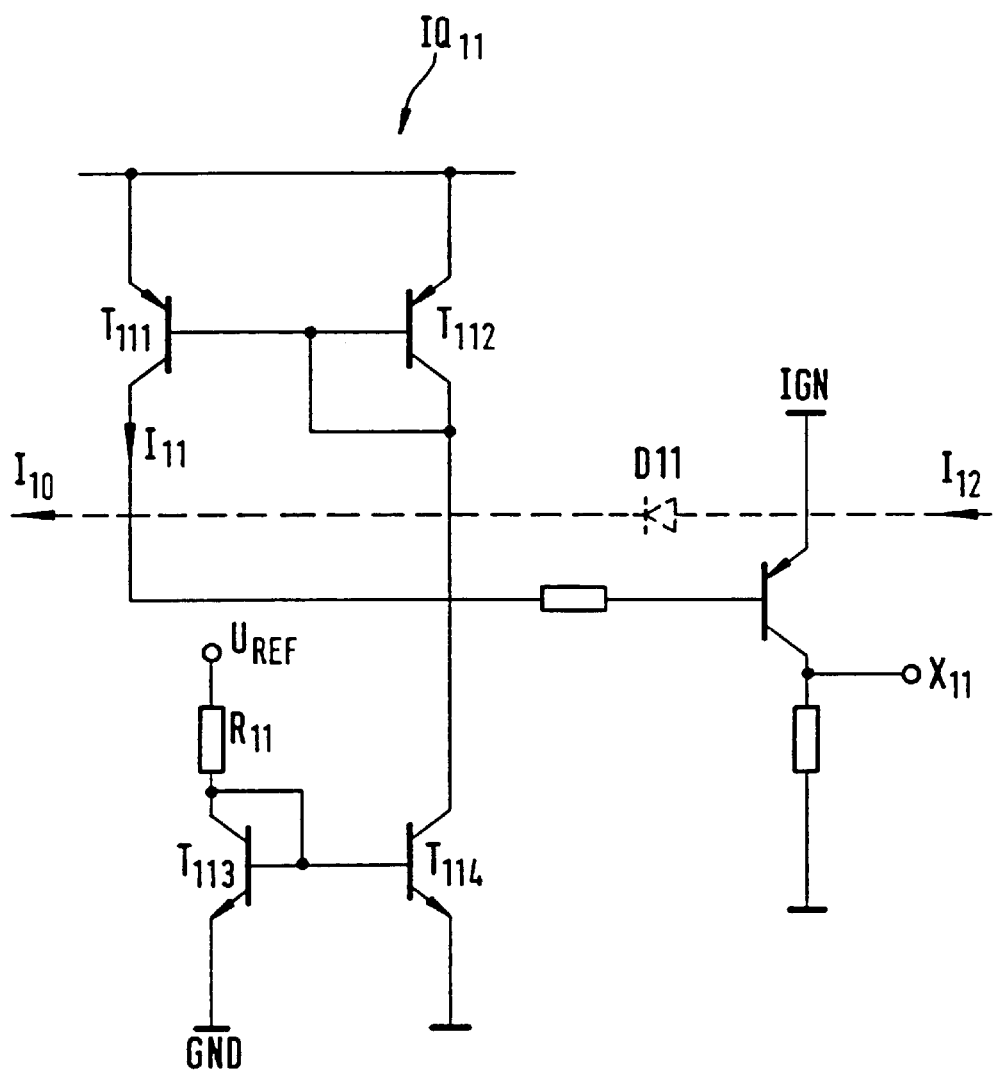
FIG. 5 shows a current source of circuit arrangement according to FIG. 4.

FIG. 5 shows details of the individual current source $IQ_{11}$; the other individual current sources have the same structure. Here again, as already described on the basis of FIG. 3, a current-mirror circuit is employed. The magnitude of the ohmic resistor $R_{11}$ and the level of the reference voltage $U_{REF}$ determine the current that flows through the transistor $T_{113}$ connected as a diode. The current mirroring through the transistor $T_{114}$, which in turn determines the current through transistor $T_{112}$, and, through another current-mirroring, the current through the transistor $T_{111}$ has the consequence that the current set by the resistor $R_{11}$ and the reference voltage $U_{REF}$ becomes the nominal current or applied current of the current source $IQ_{11}$. The nominal current of the current source is labeled $I_{11}$ here. The other two individual current sources shown in FIG. 4 are constructed in exactly the same way.

In an embodiment an active sensor 1' was employed with the current threshold values 7 mA/14 mA. In this case, the nominal currents of the three individual current sources $IQ_{11}, IQ_{12}, IQ_{13}$ were each set at 5 mA. The 7 mA sensor current here is composed of the nominal current $I_{11}=5$ mA of the individual current source $IQ_{11}$ and a current of 2 mA fed via the diode $D_{11}$, which the individual current source $IQ_{12}$ supplies. If the upper current threshold of 14 mA is reached, this current is composed of the nominal currents of the sources $IQ_{11}$ and $IQ_{12}$ and a differential current of 4 mA which the source $IQ_{13}$ supplies.

In case of a short circuit of sensor 1', the current can rise only to 15 mA.

What is claimed is:

1. A circuit for evaluating a sensor signal from a sensor, the circuit setting a lower and an upper level for the sensor signal, the circuit comprising:

a signal source that acts as the sensor, the signal source including a first current source, the first current source setting an upper current threshold and a lower current threshold, the second current source being coupled to said first current source and generating a nominal current, the nominal current falling in between the upper and lower current threshold levels, wherein a voltage across the second current source indicates a signal state of the signal source, the second current source including at least two individual current sources coupled together; and at least two amplifier circuits connected to said at least two individual current sources in said second current source, each individual current source having an associated amplifier circuit, wherein output signals in the amplifier circuits indicate whether the nominal current from the first current source from the sensor falls below the lower current threshold level or extends above the nominal current, and wherein said first and second current sources and said amplifier circuits operate together as a current limiter and an overload detector in case of a short circuit or shunt to ground.

2. The circuit according to claim 1, wherein the second current source is composed of first, second and third individual current sources that are connected in parallel with decoupling diodes inserted between the individual current sources, wherein the first individual current source triggers when the sensor signal falls below a minimum current value, the second individual current source triggers when the sensor signal falls between a mean current value and the minimum current value and the third individual current source triggers when the sensor signal falls between a maximum current value and the mean current value.

3. The circuit according to claim 2 wherein the lower current threshold and the upper current threshold are set by two individual current sources in said first current source.

4. The circuit according to claim 1, wherein the second current source includes a plurality of individual current sources, each individual current source being constructed with a currentmirror circuit and wherein nominal currents of the individual current sources are derived from a common reference voltage source via ohmic resistors and additional nominal current circuits.

5. The circuit according to claim 3, wherein the lower threshold is roughly 3 mA, the mean current value is roughly 10 mA and the upper threshold is roughly 17 mA.

* * * * *